US012095233B1

(12) United States Patent
Tamura et al.

(10) Patent No.: US 12,095,233 B1
(45) Date of Patent: Sep. 17, 2024

(54) SPARK PLUG

(71) Applicant: NITERRA CO., LTD., Aichi (JP)

(72) Inventors: Noriyuki Tamura, Aichi (JP); Haruki Yoshida, Aichi (JP); Hiroki Shimada, Aichi (JP); Tomoya Kukino, Aichi (JP); Takuto Koba, Aichi (JP); Kengo Fujimura, Aichi (JP)

(73) Assignee: NITERRA CO., LTD., Nagoya (JP)

( * ) Notice: Subject to any disclaimer, the term of this patent is extended or adjusted under 35 U.S.C. 154(b) by 0 days.

(21) Appl. No.: 18/567,541

(22) PCT Filed: Jun. 14, 2022

(86) PCT No.: PCT/JP2022/023786
§ 371 (c)(1),
(2) Date: Dec. 6, 2023

(87) PCT Pub. No.: WO2022/265008
PCT Pub. Date: Dec. 22, 2022

(30) Foreign Application Priority Data

Jun. 14, 2021 (JP) ................................. 2021-098894

(51) Int. Cl.
*H01T 13/34* (2006.01)

(52) U.S. Cl.
CPC .................................... *H01T 13/34* (2013.01)

(58) Field of Classification Search
CPC ...................................................... H01T 13/34
(Continued)

(56) References Cited

U.S. PATENT DOCUMENTS 7,858,547 B2 12/2010 Walker, Jr. et al.
8,012,898 B2 9/2011 Walker, Jr. et al.
(Continued)

FOREIGN PATENT DOCUMENTS

EP 2 854 243 A1 4/2015
JP S58-123602 A 7/1983
(Continued)

OTHER PUBLICATIONS

International Search Report from corresponding International Patent Application No. PCT/JP2022/023786, dated Aug. 16, 2022 with English-language translation.

*Primary Examiner* — Christopher M Raabe
(74) *Attorney, Agent, or Firm* — KUSNER & JAFFE

(57) ABSTRACT

A spark plug 1 of the present invention includes: an insulator 2 made from an alumina-based sintered body; a center electrode being a bar-like electrode inserted in the insulator 2 and having, on a rear end side of the center electrode, a diameter-enlarged portion enlarged in a radial direction and engaged with an inner wall of the insulator; and a conductive sealing material provided on the rear end side of the center electrode 3 inside the insulator. In a mirror-polished surface obtained by mirror-polishing a cut surface obtained by cutting the insulator in a direction perpendicular to the axial line direction, at a position 2 mm from a portion having a maximum diameter of the diameter-enlarged portion to the rear end side along the axial line direction, when 20 observation regions each being 192 μm×255 μm are set so as to each overlap a reference position being a center position between an inner peripheral surface and an outer peripheral surface of the insulator and so as not to overlap each other, an average of a proportion (porosity) of pores included in each observation region is not greater than 3.5% and, with
(Continued)

respect to a variation in the proportion (porosity), when a standard deviation is defined as σ, σ is not greater than 0.36.

7 Claims, 6 Drawing Sheets

(58) Field of Classification Search
USPC .......................................................... 313/141
See application file for complete search history.

(56) References Cited

U.S. PATENT DOCUMENTS

| | | | |
|---|---|---|---|
| 8,148,883 B2 | 4/2012 | Honda et al. | |
| 8,390,183 B2 | 3/2013 | Kurono et al. | |
| 8,970,098 B1 * | 3/2015 | Saji | H01T 13/38 313/143 |
| 9,373,940 B2 | 6/2016 | Takaoka et al. | |
| 9,912,125 B2 * | 3/2018 | Yoshida | H01T 13/38 |
| 10,340,667 B2 * | 7/2019 | Takeichi | H01T 13/34 |
| 11,183,819 B2 | 11/2021 | Yokoyama et al. | |
| 11,870,221 B2 * | 1/2024 | Walker, Jr. | H01T 13/38 |
| 2007/0123412 A1 | 5/2007 | Walker, Jr. et al. | |
| 2007/0228915 A1 | 10/2007 | Honda et al. | |
| 2009/0018008 A1 | 1/2009 | Jankowiak et al. | |
| 2010/0136867 A1 | 6/2010 | Kurono et al. | |
| 2011/0177932 A1 | 7/2011 | Walker, Jr. et al. | |
| 2015/0325982 A1 | 11/2015 | Takaoka et al. | |
| 2020/0112146 A1 | 4/2020 | Yokoyama et al. | |

FOREIGN PATENT DOCUMENTS

| | | | |
|---|---|---|---|
| JP | H11-43368 | A | 2/1999 |
| JP | 2007-250379 | A | 9/2007 |
| JP | 2010-513217 | A | 4/2010 |
| JP | 2015-69828 | A | 4/2015 |
| JP | 2015-216029 | A | 12/2015 |
| JP | 2020-57559 | A | 4/2020 |
| WO | WO-2009/119098 | A1 | 10/2009 |

* cited by examiner

SPARK PLUG

FIELD OF THE INVENTION

The present invention relates to a spark plug.

BACKGROUND OF THE INVENTION

A spark plug used in an internal combustion engine includes: an insulator having a tubular shape and made from an alumina-based sintered body mainly composed of alumina; and a center electrode housed inside the insulator (e.g., Patent Document 1). The center electrode, as a whole, has a bar-like shape of which the front end is exposed from the insulator and of which the rear end is housed inside the insulator, and includes, at the rear end side thereof, a diameter-enlarged portion (electrode flange portion) having a shape enlarged in the radial direction. In a state where the center electrode is housed inside the insulator, the diameter-enlarged portion is engaged with a portion bulged in a stepped manner at the inner wall of the insulator. At the rear end of the diameter-enlarged portion, an electrode head portion having a smaller diameter than the diameter-enlarged portion is provided.

In a state where the center electrode is housed inside the insulator, a portion (i.e., the diameter-enlarged portion and the electrode head portion) on the rear end side of the center electrode and the inner wall of the insulator are opposed to each other while keeping an interval with each other in the radial direction. While filling the space therebetween and in a form of covering the rear end of the center electrode, a conductive seal member is provided inside the insulator. The seal member is made from a conductive composition that contains glass particles of a $B_2O_3$—$SiO_2$-based material or the like and metal particles (Cu, Fe, etc.), for example.

Patent Document 1: Japanese Unexamined Patent Application Publication No. 2020-57559

At the above-described place where the portion on the rear end side of the center electrode and the inner wall of the insulator are opposed to each other in the radial direction, heat having moved from the front end side to the rear end side of the center electrode during use of a spark plug 1 easily accumulates, and in addition, electric fields are easily concentrated when a high voltage is applied to the center electrode. In the rear end side of the center electrode, particularly at the place where the diameter-enlarged portion having a shape enlarged in the radial direction is opposed to the inner wall of the insulator in the radial direction, the space is smaller, and heat concentration and electric field concentration easily occur. Therefore, in the insulator, particularly the portion opposed to the diameter-enlarged portion of the center electrode in the radial direction can be said to be in a harshest environment.

Such a portion of the insulator may be corroded by an alkaline component derived from the seal member or the like, and the withstand voltage performance of the insulator may be reduced. Since the insulator of the portion opposed to the diameter-enlarged portion of the center electrode is in direct contact with the seal member, the alkaline component contained in the seal member may corrode the above-mentioned portion of the insulator.

SUMMARY OF THE INVENTION

An object of the present invention is to provide a spark plug including an insulator excellent in alkaline corrosion resistance and the like.

The present inventors conducted thorough studies in order to attain the above object, and found the following. That is, in the internal structure of an insulator in the vicinity of a position 2 mm from a portion having the maximum diameter of the diameter-enlarged portion of the center electrode housed inside the insulator to the rear end side along the axial line direction, when pores are present in a predetermined proportion under a condition of a predetermined variation, corrosion of the insulator by an alkaline component derived from the seal member or the like is suppressed. Then, the present inventors completed the invention of the present application.

The means for solving the above problem are as follows. That is,

<1> A spark plug including: an insulator having a tubular shape extending along an axial line direction thereof and made from an alumina-based sintered body; a center electrode being a bar-like electrode inserted in the insulator such that a front end of the bar-like electrode is exposed from the insulator and a rear end of the bar-like electrode is housed inside the insulator, the center electrode having, on a rear end side thereof, a diameter-enlarged portion enlarged in a radial direction and engaged with an inner wall of the insulator; and a conductive sealing material provided on the rear end side of the center electrode inside the insulator, wherein in a mirror-polished surface obtained by mirror-polishing a cut surface obtained by cutting the insulator in a direction perpendicular to the axial line direction, at a position 2 mm from a portion having a maximum diameter of the diameter-enlarged portion to the rear end side along the axial line direction, when 20 observation regions each being 192 μm×255 μm are set so as to each overlap a reference position being a center position between an inner peripheral surface and an outer peripheral surface of the insulator and so as not to overlap each other, an average of a proportion (porosity) of pores included in each observation region is not greater than 3.5% and, with respect to a variation in the proportion (porosity), when a standard deviation is defined as a, a is not greater than 0.36.

<2> The spark plug according to <1> above, wherein in the observation region, an average of the number of large pores, out of the pores, each having an area of not less than 0.05 $\mu m^2$ is not less than 200 and not greater than 600.

<3> The spark plug according to <2> above, wherein, with respect to a variation in the number of the large pores in the observation region, when a standard deviation is defined as $\sigma$, 3 $\sigma$ is not greater than 100.

<4> The spark plug according to <3> above, wherein the $3\sigma$ is not greater than 50.

<5> The spark plug according to any one of <2> to <4> above, wherein, in the observation region, the average of the proportion (porosity) of the pores is not less than 1.0% and the average of the number of the large pores is not less than 240.

<6> The spark plug according to any one of <2> to <5> above, wherein, in the observation region, with respect to a variation in the number of the large pores, when a standard deviation is defined as a, a value of "the average of the number $+3\sigma$" is less than 330.

<7> The spark plug according to any one of <2> to <6> above, wherein in the mirror-polished surface, when a region provided between the inner peripheral surface and the outer peripheral surface of the insulator is divided such that a length thereof in the radial direction is trisected, with respect to an inner side region provided on an innermost side, 20 inner side observation regions each being 192 μm×255 μm are set so as not to overlap each other, and with respect to an outer side region provided on an outermost side, 20 outer side observation regions each being 192 μm×255 μm are set so as not to overlap each other, an average of a proportion (porosity) of pores included in each inner side observation region is smaller by 0.1 to 2% than an average of a proportion (porosity) of pores included in each outer side observation region.

According to the present invention, a spark plug including an insulator excellent in alkaline corrosion resistance and the like can be provided.

DETAILED DESCRIPTION OF THE INVENTION

First Embodiment

Figure 1:
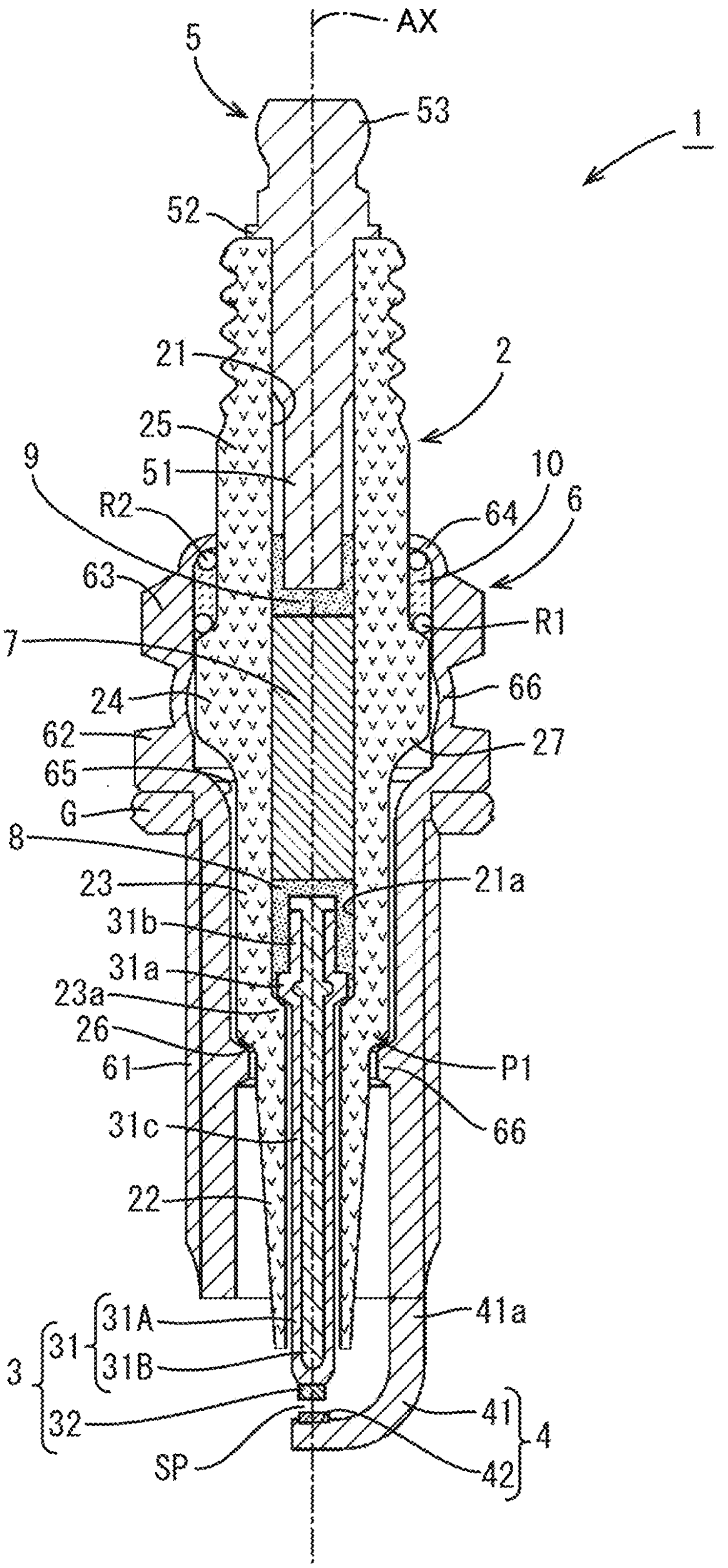
FIG. 1 is a sectional view along an axial line direction of a spark plug according to a first embodiment.

A spark plug 1 according to a first embodiment of the present invention will be described with reference to FIG. 1 to FIG. 6. FIG. 1 is a sectional view along an axial line AX direction of the spark plug 1 according to the first embodiment. An alternate long and short dash line extending in the up-down direction shown in FIG. 1 is an axial line AX of the spark plug 1. In FIG. 1, the longitudinal direction (the axial line AX direction) of the spark plug 1 corresponds to the up-down direction in FIG. 1. On the lower side in FIG. 1, the front end side of the spark plug 1 is shown, and on the upper side in FIG. 1, the rear end side of the spark plug 1 is shown.

The spark plug 1 is mounted to an engine (an example of an internal combustion engine) of an automobile, and is used for ignition of an air-fuel mixture in a combustion chamber of the engine. The spark plug 1 mainly includes an insulator 2, a center electrode 3, a ground electrode 4, a metal terminal 5, a metal shell 6, a resistor 7, and seal members 8, 9.

The insulator 2 is a substantially cylindrical member extending in the axial line AX direction and including a through-hole 21 therein. Details of the insulator 2 will be described later.

The metal shell 6 is a member used when mounting the spark plug 1 to the engine (specifically, an engine head), has, as a whole, a cylindrical shape extending in the axial line AX direction, and is formed from a conductive metal material (e.g., low-carbon steel material). At the outer peripheral surface on the front end side of the metal shell 6, a screw portion 61 is formed. A ring-shaped gasket G is externally fitted on the rear end (a so-called thread root) of the screw portion 61. The gasket G has an annular shape, and is formed by bending a metal plate. The gasket G is disposed between the rear end of the screw portion 61 and a seat portion 62 provided on the rear end side relative to the screw portion 61, and seals a space formed between the spark plug 1 and the engine (engine head) when the spark plug 1 is mounted to the engine.

A tool engagement portion 63 for engaging a tool such as a wrench when mounting the metal shell 6 to the engine is provided on the rear end side of the metal shell 6. A thin crimping portion 64 bent to the radially inner side is provided in a rear end portion of the metal shell 6.

The metal shell 6 includes therein an insertion hole 65 penetrating in the axial line AX direction, and, in a form of being inserted through the insertion hole 65, the insulator 2 is held inside the metal shell 6. The rear end of the insulator 2 is in a state of protruding to a large extent from the rear end of the metal shell 6 to the outer side (the upper side in FIG. 1). In contrast to this, the front end of the insulator 2 is in a state of slightly protruding from the front end of the metal shell 6 to the outer side (the lower side in FIG. 1).

Between the inner peripheral surface of the portion from the tool engagement portion 63 to the crimping portion 64 of the metal shell 6 and the outer peripheral surface (the outer peripheral surface of a rear-side tube portion 25 described later) of the insulator 2, a region having an annular shape is formed, and in the region, a first ring member R1 and a second ring member R2 each having an annular shape are disposed in a state of being separated from each other in the axial line AX direction. Powder of a talc 10 is filled between the first ring member R1 and the second ring member R2. The rear end of the crimping portion 64 is bent to the radially inner side, and is fixed to the outer peripheral surface (the outer peripheral surface of the rear-side tube portion 25 described later) of the insulator 2.

The metal shell 6 includes a thin compressive deformation portion 66 provided between the seat portion 62 and the tool engagement portion 63. During manufacture of the spark plug 1, the compressive deformation portion 66 is compressively deformed by the crimping portion 64, which is fixed to the outer peripheral surface of the insulator 2, being pressed to the front end side. Due to the compressive deformation of the compressive deformation portion 66, the insulator 2 is pressed to the front end side in the metal shell 6 through the first ring member R1, the second ring member R2, and the talc 10. At that time, the outer peripheral surface of a portion (a first diameter-enlarged portion 26 described later), which is a part of the insulator 2, enlarged in an annular shape to the outer side is pressed against, with a packing P1 interposed, the surface of a step portion 66 provided on the inner periphery side of the metal shell 6. Therefore, even when gas in the combustion chamber of the engine enters a space formed between the metal shell 6 and the insulator 2, the gas is prevented from leaking out to the outside by the packing P1 provided in the space.

In a state where the insulator 2 is mounted inside the metal shell 6, the center electrode 3 is provided inside the insulator 2. The center electrode 3 includes: a bar-like center electrode body 31 extending along the axial line AX direction; and a substantially columnar (substantially disc-shaped) tip (center electrode tip) 32 mounted to the front end of the center electrode body 31. The center electrode body 31 of the center electrode 3 is, as a whole, a bar-like member having a length shorter in the longitudinal direction than those of the insulator 2 and the metal shell 6. The center electrode body 31 is inserted in the through-hole 21 of the insulator 2 such that the front end of the center electrode body 31 is exposed to the outside from the insulator 2 and the rear end of the center electrode body 31 is housed inside the insulator 2. The center electrode body 31 includes an electrode base material 31A provided on the outer side, and a core portion 31B embedded in the electrode base material 31A. The electrode base material 31A is formed by using, for example, nickel or an alloy (e.g., NCF600, NCF601) mainly composed of nickel. The core portion 31B is formed from copper or a nickel-based alloy mainly composed of copper, which is excellent in thermal conductivity when compared with the alloy forming the electrode base material 31A.

The center electrode body 31 includes, on the rear end side thereof, a diameter-enlarged portion (electrode flange portion) 31*a* having a shape enlarged in the radial direction. The center electrode body 31 includes: an electrode head portion 31*b*, which is a portion on the rear end side relative to the diameter-enlarged portion 31*a*; and an electrode leg portion 31*c*, which is a portion on the front end side relative to the diameter-enlarged portion 31*a*. The electrode leg portion 31*c* is a bar-like member inserted in the through-hole 21 of the insulator 2 such that the front end of the bar-like member is exposed from the insulator 2 and the rear end of the bar-like member is housed inside the insulator 2. The diameter-enlarged portion 31*a* is continuous to the rear end of the electrode leg portion 31*c*, and has a shape enlarged in the radial direction when compared with the electrode leg portion 31*c*. In a state of being housed in the insulator 2, the diameter-enlarged portion 31*a* is engaged with a step portion 23*a* (described later) formed at an inner wall 21*a* of the insulator 2. The front end (i.e., the front end of the center electrode body 31) of the electrode leg portion 31*c* protrudes to the front end side relative to the front end of the insulator 2. The diameter-enlarged portion 31*a* is a bar-like portion shorter than the electrode leg portion 31*c*, and has a smaller diameter than the diameter-enlarged portion 31*a*.

The tip 32 has a substantially columnar shape (substantially disc shape), and is joined to the front end (the front end of the electrode leg portion 31*c*) of the center electrode body 31 by resistance welding, laser welding, or the like. The tip 32 is made from a material (e.g., an iridium-based alloy mainly composed of iridium (Ir)) mainly composed of a noble metal having a high melting point.

The metal terminal 5 is a bar-like member extending in the axial line AX direction, and is mounted in a form of being inserted to the rear end side of the through-hole 21 of the insulator 2. The metal terminal 5 is disposed to the rear end side relative to the center electrode 3, in the insulator 2 (the through-hole 21). The metal terminal 5 is formed from a conductive metal material (e.g., low-carbon steel). The surface of the metal terminal 5 may be plated with nickel or the like for the purpose of anticorrosion or the like.

The metal terminal 5 includes: a bar-like terminal leg portion 51 provided on the front end side; a terminal flange portion 52 provided on the rear end side of the terminal leg portion 51; and a cap mounting portion 53 provided to the rear end side relative to the terminal flange portion 52. The terminal leg portion 51 is inserted in the through-hole 21 of the insulator 2. The terminal flange portion 52 is a portion that is exposed from a rear end portion of the insulator 2 and that is engaged with the rear end portion. The cap mounting portion 53 is a portion to which a plug cap (not shown) having a high-voltage cable connected thereto is mounted, and through the cap mounting portion 53, a high voltage for causing spark discharge is applied from outside.

The resistor 7 is disposed, in the through-hole 21 of the insulator 2, between the front end (the front end of the terminal leg portion 51) of the metal terminal 5 and the rear end (the rear end of the center electrode body 31) of the center electrode 3. The resistor 7 has a resistance (e.g., 5 kΩ) of not less than 1 kΩ, for example, and has a function of reducing electric wave noise at the time of occurrence of spark, for example. The resistor 7 is formed from a composition that contains glass particles as a main component, ceramic particles other than glass, and a conductive material.

A space is provided between the front end of the resistor 7 and the rear end of the center electrode 3 in the through-hole 21, and a conductive seal member 8 is provided in a form of filling the space. A space is also provided between the rear end of the resistor 7 and the front end of the metal terminal 5 in the through-hole 21, and a conductive seal member 9 is provided in a form of filling the space. Each seal member 8, 9 is formed from a conductive composition that contains glass particles of a $B_2O_3$—$SiO_2$-based material or the like and metal particles (Cu, Fe, etc.), for example.

The ground electrode 4 includes a ground electrode body 41 joined to the front end of the metal shell 6, and a ground electrode tip 42 having a quadrangular column shape. The ground electrode body 41 is made of, as a whole, a plate piece bent in a substantially L-shape at a portion, and a rear end portion 41*a* thereof is joined to the front end of the metal shell 6 by resistance welding or the like. Accordingly, the metal shell 6 and the ground electrode body 41 are electrically connected to each other. Similar to the metal shell 6, the ground electrode body 41 is formed by using, for example, nickel or a nickel-based alloy (e.g., NCF600, NCF601) mainly composed of nickel. Similar to the tip 32 of the center electrode 3, the ground electrode tip 42 is made from an iridium-based alloy mainly composed of iridium (Ir), for example. The ground electrode tip 42 is joined to a front end portion of the ground electrode body 41 by laser welding.

The ground electrode tip 42 at the front end portion of the ground electrode body 41 and the tip 32 at the front end portion of the center electrode 3 are disposed so as to be opposed to each other while keeping an interval with each other. That is, there is a space SP between the tip 32 at the front end portion of the center electrode 3 and the ground electrode tip 42 at the front end portion of the ground electrode 4, and when a high voltage is applied between the center electrode 3 and the ground electrode 4, spark discharge occurs, in the space SP, in a form of being generally along the axial line AX direction.

Next, the insulator 2 will be described in detail. The insulator 2, as a whole, has a tubular shape (cylindrical shape) elongated along the axial line AX direction and includes therein the through-hole 21 extending in the axial line AX direction, as shown in FIG. 1. The insulator 2 is formed from an alumina-based sintered body, having a tubular shape (cylindrical shape), which is mainly composed of alumina. The insulator 2 includes: a leg portion 22 provided on the front end side; a middle trunk portion 23 which is a portion provided on the rear end side of the leg portion 22 and which has a larger diameter than the leg portion 22; and a flange portion 24 which is a portion provided on the rear end side of the middle trunk portion 23 and which has a larger diameter than the middle trunk portion 23. The first diameter-enlarged portion 26 is provided between the leg portion 22 and the middle trunk portion 23, and a second diameter-enlarged portion 27 is provided between the middle trunk portion 23 and the flange portion 24.

The leg portion 22, as a whole, has an elongated tubular shape (cylindrical shape) of which the outer diameter is gradually increased from the front side toward the rear side, and has a smaller outer diameter than the middle trunk portion 23 and the first diameter-enlarged portion 26. When the spark plug 1 is mounted to the engine (engine head), the leg portion 22 is exposed in the combustion chamber of the engine.

The flange portion 24 is provided substantially at the center of the insulator 2 in the axial line AX direction, and has an annular shape. The resistor 7 is provided in the through-hole 21 inside the flange portion 24.

The first diameter-enlarged portion 26 is a portion connecting the leg portion 22 and the middle trunk portion 23, and has a cylindrical shape (annular shape) of which the outer diameter gradually increases from the front side toward the rear side. When the insulator 2 is mounted to the metal shell 6, the outer surface of this first diameter-enlarged portion 26 of the insulator 2 is placed against, with the packing P1 interposed, the surface of the step portion 66 provided on the inner periphery side of the metal shell 6.

The second diameter-enlarged portion 27 is a portion connecting the middle trunk portion 23 and the flange portion 24, and has a cylindrical shape (annular shape) of which the outer diameter is larger than the first diameter-enlarged portion 26 and of which the outer diameter gradually increases from the front side toward the rear side.

The middle trunk portion 23 has a tubular shape (cylindrical shape) of which the outer diameter is set to be substantially the same in the axial line AX direction. In a state where the insulator 2 is mounted to the metal shell 6, a minute space is present between the outer surface (outer peripheral surface) of the middle trunk portion 23 and the inner surface (inner peripheral surface) of the metal shell 6. On the inner side (inner peripheral surface side) close to the front end of the middle trunk portion 23, the step portion 23*a* having an annular shape is provided. In a state where the center electrode body 31 of the center electrode 3 is housed in the through-hole 21 of the insulator 2, the diameter-enlarged portion 31*a* of the center electrode body 31 is engaged with the surface of the step portion 23*a*. The thickness (the thickness in the radial direction) of the wall portion of the middle trunk portion 23 is larger than the thickness of the wall portion of the leg portion 22. In the middle trunk portion 23, the thickness of the wall portion of the part from the front end side up to the step portion 23*a* is larger than the thickness of the wall portion of the part on the rear side thereof.

The outer peripheral surface of the middle trunk portion 23 is exposed to the atmosphere (air), and it can be said that the middle trunk portion 23 is in an environment in which electricity is easily conducted when compared with the leg portion 22. Therefore, the thickness of the wall portion of the middle trunk portion 23 is set to be larger than that of the leg portion 22.

In the present specification, unless otherwise specified, the "thickness of the middle trunk portion 23" denotes the thickness of the wall portion, in the middle trunk portion 23, of the part (i.e., the part on the rear end side relative to the step portion 23*a*) where the thickness of the wall portion is substantially constant. The thickness of the middle trunk portion 23 is not limited in particular as long as the object of the present invention is not impaired, and is set to about 2.0 mm to 3.0 mm, for example.

The insulator 2 further includes the rear-side tube portion 25 connected to the rear end side of the flange portion 24 and having a tubular shape (cylindrical shape) extending in the axial line AX direction. The rear-side tube portion 25 has an outer diameter smaller than the outer diameter of the flange portion 24. In the through-hole 21 inside the rear-side tube portion 25, the bar-like terminal leg portion 51 of the metal terminal 5, and the like, are provided.

Figure 2:
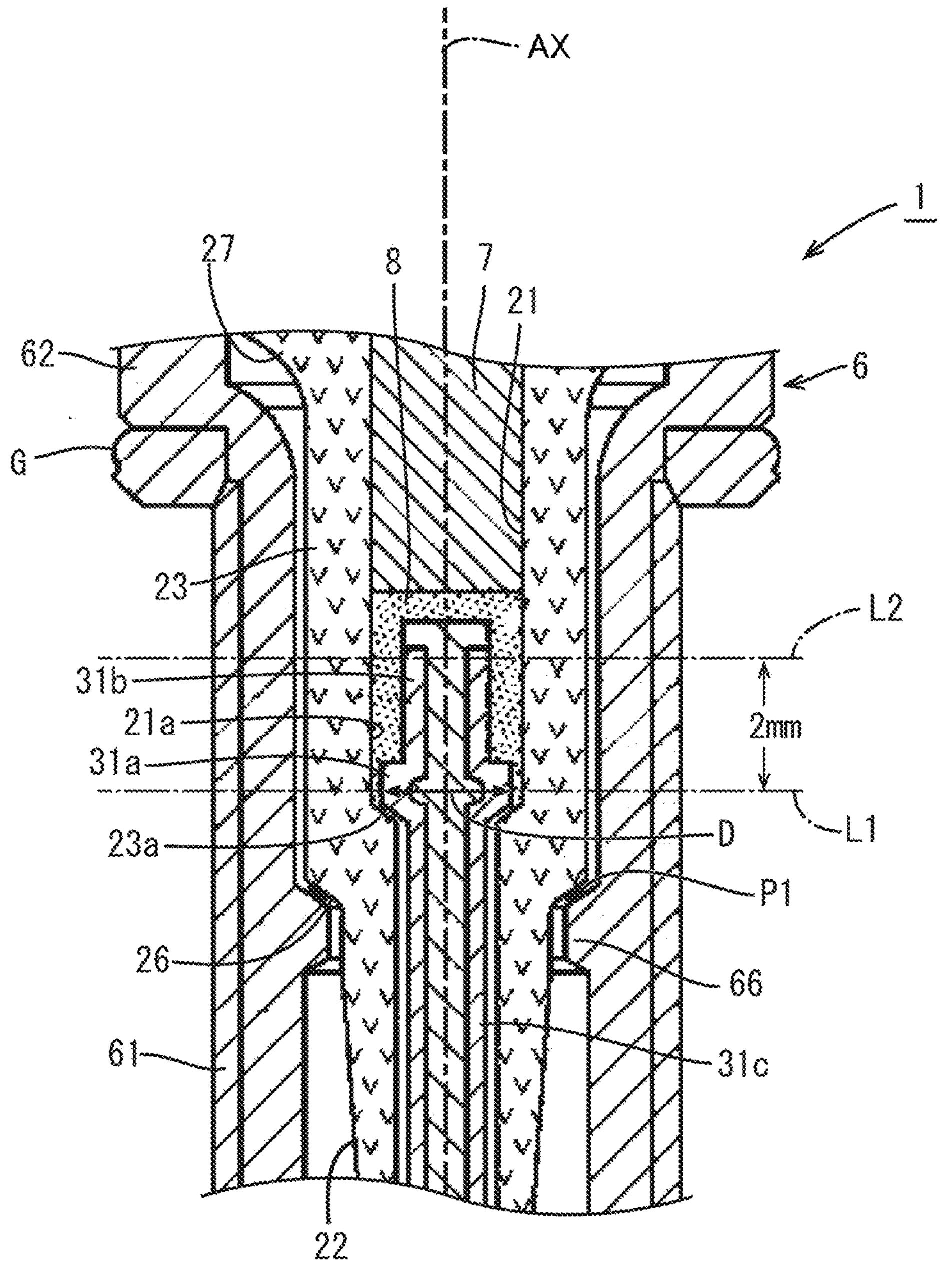
FIG. 2 is an enlarged sectional view of the vicinity of a diameter-enlarged portion of a center electrode housed in a middle trunk portion of an insulator.

FIG. 2 is an enlarged sectional view of the vicinity of the diameter-enlarged portion 31*a* of the center electrode 3 (the center electrode body 31) housed in the middle trunk portion 23 of the insulator 2. As shown in FIG. 2, in a state where the center electrode body 31 of the center electrode 3 is housed inside the insulator 2, there is a space between: the inner wall 21*a* of the insulator 2; and the diameter-enlarged portion 31*a* and the electrode head portion 31*b* which are portions on the rear end side of the center electrode body 31. In a form of filling the space and covering the rear end of the center electrode body 31, the through-hole 21 of the insulator 2 is filled with the seal member 8 described above. The seal member 8 contains an alkaline component derived from glass particles and the like.

The interval between the diameter-enlarged portion 31*a* of the center electrode 3 and the inner wall 21*a* of the insulator 2 is smaller than the interval between the electrode head portion 31*b* and the inner wall 21*a* of the insulator 2. In such a place, heat having moved from the front end side of the center electrode body 31 of the center electrode 3 through the diameter-enlarged portion 31*a* easily accumulates. In addition, in that place, electric fields are easily concentrated when a high voltage is applied to the center electrode 3. Therefore, in the middle trunk portion 23 in the insulator 2, particularly the portion opposed to the diameter-enlarged portion 31*a* in the radial direction is in a harshest environment.

Since the inner side of the middle trunk portion 23 having a tubular shape is filled with the seal member 8, the inner wall 21*a* of the middle trunk portion 23 is in a state of being in direct contact with the seal member 8. Therefore, a state where the alkaline component derived from the seal member 8 can be in contact with the inner wall 21*a* of the middle trunk portion 22 is present.

The insulator 2 of the present embodiment is excellent in alkaline corrosion resistance and the like since the internal structure of the alumina-based sintered body forming the middle trunk portion 23 satisfies at least Condition 1 shown below.

<Condition 1>

In a mirror-polished surface 230*a* obtained by mirror-polishing a cut surface 230 obtained by cutting the insulator 2, in a direction perpendicular to the axial line AX direction, at a position 2 mm from a portion having the maximum diameter of the diameter-enlarged portion 31*a* to the rear end side along the axial line AX direction, when 20 observation regions X each being 192 μm×255 μm are set so as to each overlap a reference position m1 being a center position between an inner peripheral surface 2*a* and an outer peripheral surface 2*b* of the insulator 2 and so as not to overlap each other, an average A of the proportion (porosity) of pores 11 included in each observation region X is not greater than 3.5% and, with respect to the variation in the proportion (porosity), when the standard deviation is defined as a, a is not greater than 0.36.

Here, Condition 1 will be described in detail with reference to FIG. 2 to FIG. 5. The "portion having the maximum diameter of the diameter-enlarged portion 31*a*" shown in Condition 1 is the portion, of the diameter-enlarged portion 31*a* of the center electrode body 31 of the center electrode 3, of which a diameter D is maximum, as shown in FIG. 2. FIG. 2 shows a straight line L1 so as to perpendicularly cross the axial line AX and extend across the portion having the maximum diameter of the diameter-enlarged portion 31*a*.

Then, the insulator 2 is cut into a round slice shape at a position separated by 2 mm from the portion having the maximum diameter of the diameter-enlarged portion 31*a* to the rear end side of the spark plug 1 along the axial line AX direction. In the insulator 2, the range in the axial line AX direction from the portion having the maximum diameter of the diameter-enlarged portion 31*a* to a position separated by at least 2 mm is the place for which durability (withstand voltage performance, etc.) is required most.

The internal structure of the alumina-based sintered body forming such a range is basically the same, and thus, in the present embodiment, in consideration of ease of cutting, etc., the position separated by 2 mm from the portion having the maximum diameter of the diameter-enlarged portion 31*a* to the rear end side is set as the place where the insulator 2 is cut.

In a case where the portion having the maximum diameter of the diameter-enlarged portion 31*a* is formed so as to have a certain width from the front end side toward the rear end side in the axial line AX direction, the position (the position indicated by the straight line L1) serving as a reference when the position separated by 2 mm to the rear end side is to be set is the position on the frontmost side in the portion having the maximum diameter.

In FIG. 2, the place where the insulator 2 is cut is indicated by a straight line L2. The straight line L2 is shown so as to perpendicularly cross the axial line AX at the position separated by 2 mm from the straight line L1 to the rear end side (the upper side in FIG. 2). As shown in FIG. 2, the straight line L2 extends so as to cross the middle trunk portion 23 of the insulator 2 in the radial direction. In Condition 1, the state of the internal structure of the cut surface 230 obtained by cutting the middle trunk portion 23 in the radial direction along the straight line L2 is defined.

Figure 3:
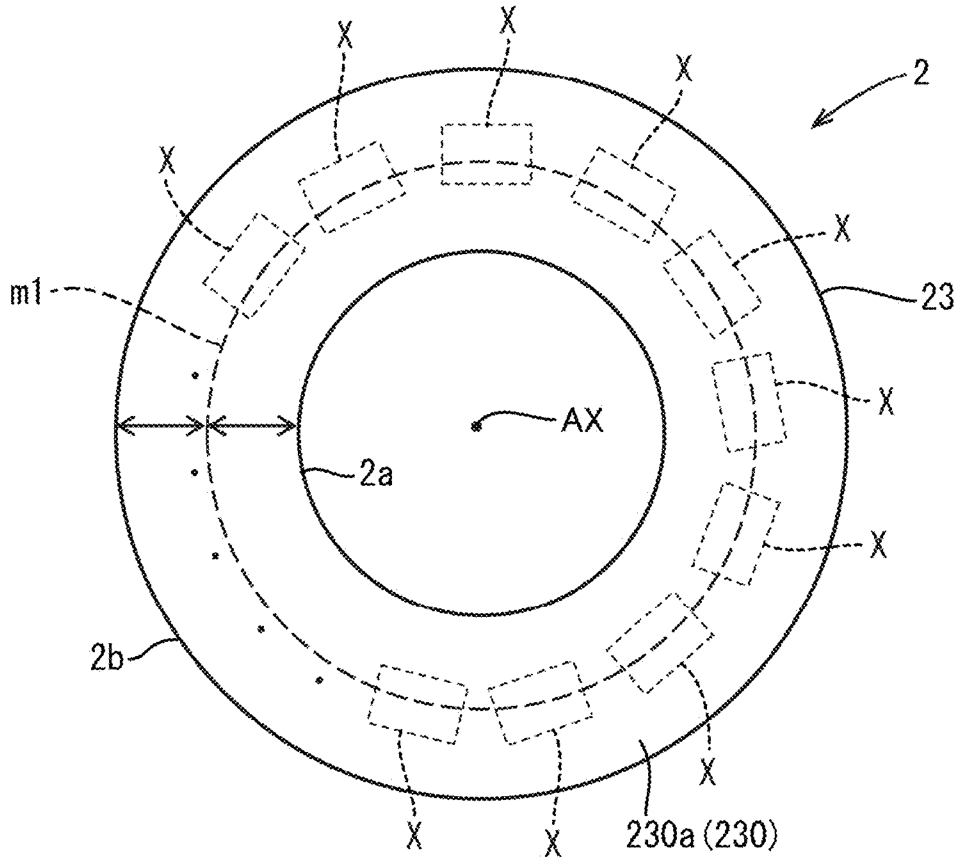
FIG. 3 schematically illustrates a mirror-polished surface obtained by mirror-polishing a cut surface of the middle trunk portion of the insulator.

FIG. 3 schematically illustrates the mirror-polished surface 230*a* obtained by mirror-polishing the cut surface 230 of the middle trunk portion 23 of the insulator 2. In FIG. 3, the cut surface 230 obtained by cutting the middle trunk portion 23 into a round slice shape along the straight line L2 shown in FIG. 2 is shown in a state of being polished into a mirror state. The cut surface 230 having been subjected to a later-described mirror-polishing treatment and being in a mirror state will be referred to as the mirror-polished surface 230*a*.

The mirror-polishing treatment for the cut surface 230 is performed based on a known technique using a diamond grinding wheel, a polishing agent such as a diamond paste, or the like. The mirror-polishing treatment is performed until the surface roughness (Ra) of the cut surface 230 becomes about 0.001 μm, for example.

The mirror-polished surface 230*a* is observed by using a scanning electron microscope (SEM). Thus, the mirror-polished surface 230*a* may be subjected to carbon vapor deposition for providing conductivity, as necessary. In the case of the present embodiment, the acceleration voltage of the SEM during observation of the mirror-polished surface 230*a* is set to 20 kV, and the magnification of the SEM is set to 500 times.

As shown in FIG. 3, the mirror-polished surface 230*a* has an annular shape, and in the mirror-polished surface 230*a*, the reference position m1 in a circular shape indicating the center position between the inner peripheral surface 2*a* and the outer peripheral surface 2*b* of the insulator 2 is set. In Condition 1, in the mirror-polished surface 230*a*, 20 observation regions X each being 192 μm×255 μm are set so as to each overlap the reference position m1 and so as not to overlap each other.

Each observation region X is a region set so as to grasp the state of pores (voids) 11 in the internal structure of the mirror-polished surface 230*a* (the cut surface 230), and has a rectangular shape. The observation region X is a region having a rectangular shape of which one side has a length of 192 μm and of which the other side has a length of 255 μm (i.e., 192 μm×255 μm).

When the observation region X is set on the mirror-polished surface 230*a* in the vicinity of the inner peripheral surface 2*a* of the insulator 2, if the internal structure on the inner peripheral surface 2 side of the insulator 2 (the middle trunk portion 23) has been corroded by an alkaline component, the state of the original internal structure of the insulator 2 cannot be observed. Therefore, in the present embodiment, as described above, the observation region X is set so as to overlap the reference position m1. In the mirror-polished surface 230*a*, 20 observation regions X in total are set so as not to overlap each other. In the case of the present embodiment, as shown in FIG. 3, these observation regions X are preferably set so as to be arranged in an annular shape while keeping an interval with each other in the mirror-polished surface 230*a* having an annular shape.

Figure 4:
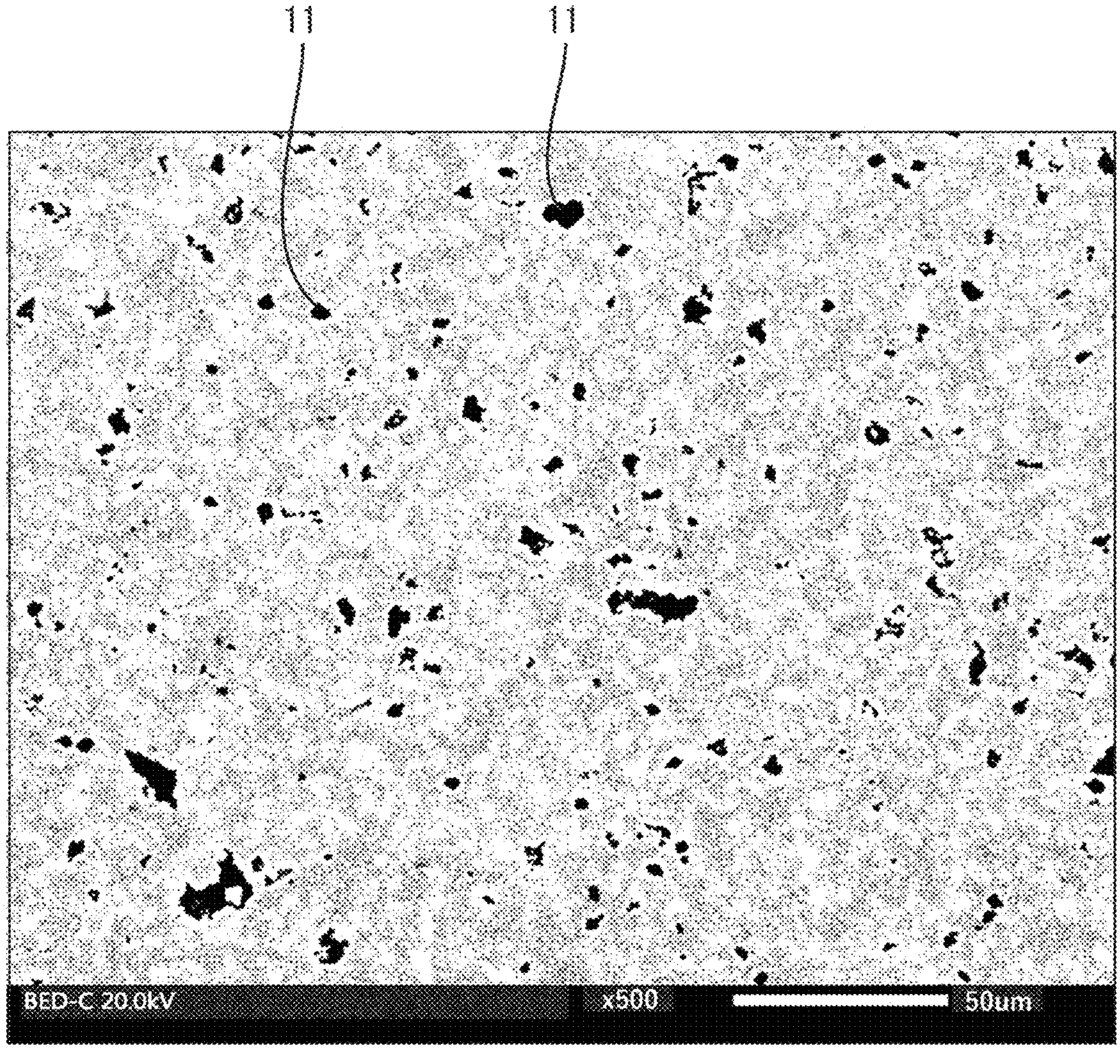
FIG. 4 illustrates an SEM image corresponding to an observation region.

An image of the mirror-polished surface 230*a* in the range corresponding to such an observation region X is captured by using the SEM, whereby an SEM image corresponding to the observation region X is acquired. The SEM image is acquired for each of the 20 observation regions X. That is, 20 SEM images in total are acquired so as to correspond to the 20 observation regions X in total. FIG. 4 illustrates an SEM image corresponding to the observation region X. As shown in FIG. 4, in the SEM image, a plurality of pores 11 are shown.

With respect to the 20 SEM images in total, image analysis processing is performed by using known image analysis software (e.g., WinROOF (registered trademark) manufactured by MITANI CORPORATION) that is executed on a computer.

In the image analysis processing, first, with respect to each individual SEM image, a size calibration process (calibration) according to a scale bar provided to the SEM image is performed.

Figure 5:
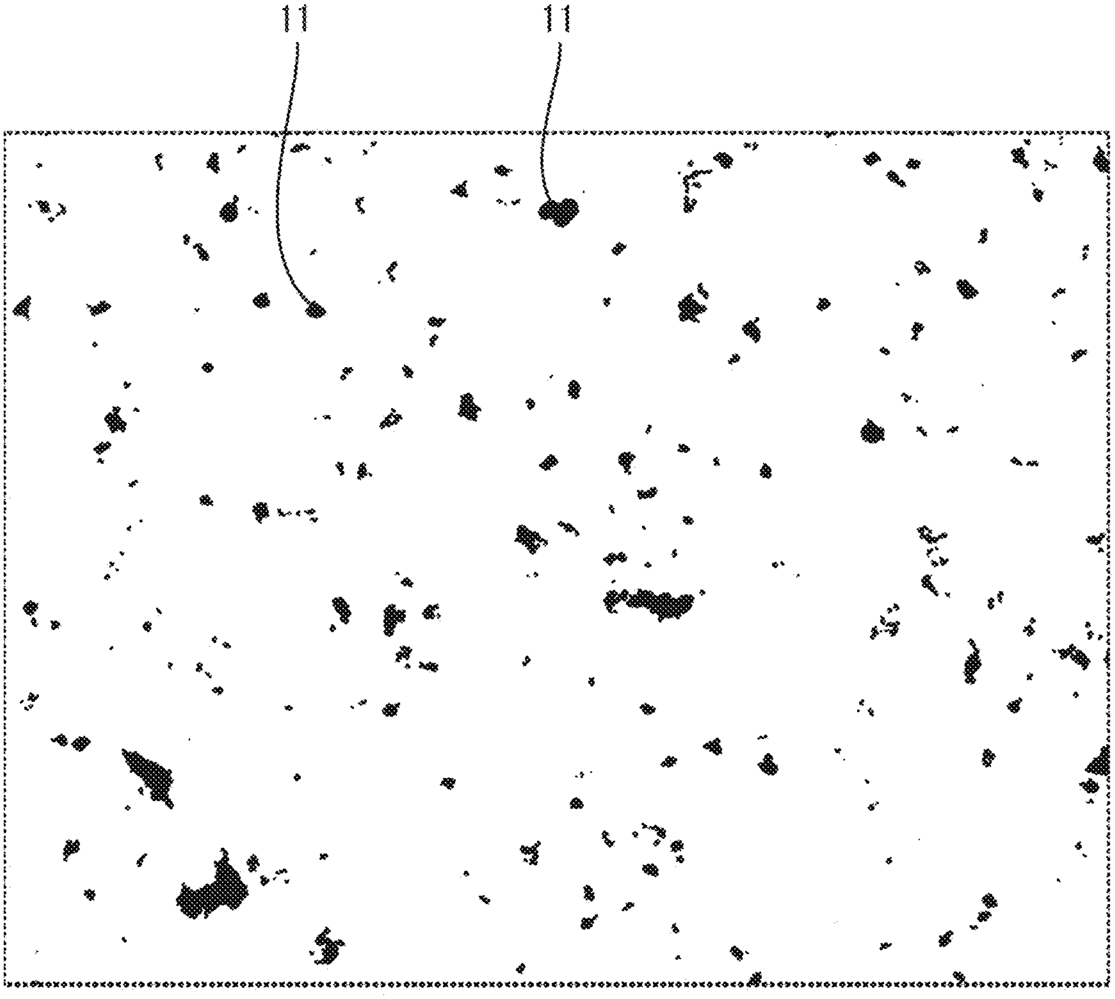
FIG. 5 illustrates a binarized image obtained through binarization of an SEM image.

Next, binarization is performed on the SEM image after the calibration process. FIG. 5 illustrates a binarized image obtained through binarization of an SEM image. In the binarization, the brightness (lightness) of each pixel in the SEM image is expressed in two gradations by using a predetermined threshold (e.g., threshold=118). That is, with respect to a pixel of which the brightness is not greater than a threshold, the brightness of the pixel is set to "0", and with respect to a pixel of which the brightness exceeds the threshold, the brightness of the pixel is set to "255". The expression in the two gradations eliminates intermediate gradations, whereby a binarized image is obtained. In the binarized image in FIG. 5, pores 11 are shown in black, and the other portion (ceramic portion) 12 is shown in white.

Then, by use of the binarized image corresponding to the observation region X, and by a known image analysis technique, extraction of all of the pores (voids) 11 included in the observation region X is performed. In the case of the present embodiment, extraction of the pores 11 is performed, with respect to the 20 observation regions X, for each observation region X. At the extraction of the pores 11, the area of each pore 11 is also obtained by a known image analysis technique.

Subsequently, for each observation region X, with respect to all of the pores 11 extracted from the corresponding binarized image, the total area of the pores 11 is calculated. Then, for each observation region X, the proportion (hereinafter, porosity) of the total area of all of the pores 11 included in one observation region X relative to the area of the observation region X is obtained. The porosity is obtained for each of the 20 observation regions.

Then, by use of 20 porosities in total respectively obtained for the 20 observation regions, an average A of the porosity is obtained.

In the case of the present embodiment, the internal structure of the insulator 2 (the middle trunk portion 23) is formed such that the average A of the porosity under Condition 1 becomes not greater than 3.5%.

In Condition 1, the variation in the porosity is defined. Specifically, when the frequency distribution of the 20 porosities in total corresponding to the respective observation regions X is regarded as a normal distribution, and the standard deviation of the porosity is defined as a, a is set to be not greater than 0.36.

The insulator 2 that satisfies Condition 1 is obtained by, for example: during manufacture, using Al compound powder (e.g., alumina powder) having a small (sharp) particle size distribution; applying a pressure under a higher pressure condition than in conventional art, when granulated powder is molded with a predetermined mold in a molding step in the method for manufacturing the insulator 2 described later; and the like.

In the spark plug 1 of the present embodiment, when the internal structure of the insulator 2 (in particular, the middle trunk portion 23) at least satisfies Condition 1 above, corrosion by an alkaline component is suppressed.

The alumina-based sintered body forming the insulator 2 is a liquid phase sintered body, and a liquid phase (glass component) is present around the crystal grains of alumina particles. The pores 11 are present in such a liquid phase. In the internal structure at a predetermined place of the insulator 2, when the pores 11 are present so as to satisfy Condition 1, a state where the liquid phase containing the pores is present so as to be uniformly dispersed while being separated from each other is established. The alkaline component derived from the seal member 8 and the like moves in a form of being soaked into the liquid phase portion in the internal structure of the insulator 2. Therefore, when the liquid phase is present so as to be uniformly dispersed while being separated from each other as described above, it becomes difficult for the alkaline component to enter the internal structure of the insulator 2 to move. Therefore, even when the insulator 2 of the present embodiment is in direct contact with the seal member 8, corrosion by the alkaline component is suppressed.

Further, in the spark plug 1 of the present embodiment, in addition to Condition 1 above, the internal structure of the middle trunk portion 23 of the insulator 2 may be formed so as to satisfy Condition 2 described below.

<Condition 2>

In the observation region X, an average B of the number of large pores, out of the pores, each having an area of not less than 0.05 $\mu m^2$ is not less than 200 and not greater than 600.

The average B of the number of the large pores in Condition 2 is obtained as below. First, with respect to the 20 observation regions X, for each observation region X, the number of the large pores each having an area of not less than 0.05 $\mu m^2$ is counted. Then, based on 20 values (number data) in total of the number of the large pores counted with respect to the respective 20 observation regions, the average (average number) B of the number of the large pores is obtained.

In the case of the present embodiment, the internal structure of the insulator 2 (the middle trunk portion 23) is formed such that the average B of the number of the large pores under Condition 2 becomes not less than 200 and not greater than 600.

The insulator 2 that satisfies Condition 2 is obtained by, for example, changing the size of spray-dried granules during manufacture, and the like.

When the insulator 2 of the spark plug 1 satisfies Condition 2 in addition to Condition 1, in the internal structure of the insulator 2, the number of the large pores that the alkaline component relatively easily enters is suppressed in a predetermined small range, to some extent. Thus, the alkaline corrosion resistance is further improved.

Further, in the spark plug 1 of the present embodiment, in addition to Condition 1 and Condition 2 above, the internal structure of the middle trunk portion 23 of the insulator 2 may be formed so as to satisfy Condition 3 described below.

<Condition 3>

With respect to the variation in the number of the large pores in the observation region X, when the standard deviation is defined as $\sigma$, 3 $\sigma$ is not greater than 100.

In Condition 3, the variation in the number of the large pores is defined. Specifically, when the frequency distribution of the 20 values (number data) in total of the number of the large pores corresponding to the respective observation regions X is regarded as a normal distribution, and the standard deviation of the value (number data) of the number is defined as $\sigma$, 3 $\sigma$ is set to be not greater than 100.

The insulator 2 that satisfies Condition 3 is obtained by, for example, changing the size of spray-dried granules during manufacture, and the like.

When Condition 3 is further satisfied in addition to Condition 1 and Condition 2, in the internal structure of the insulator 2 (the middle trunk portion 23), unevenness in the number of the large pores (the number) becomes small, and local strength insufficiency is suppressed. Thus, mechanical strength (impact resistance) of the insulator 2 is improved.

$3\sigma$ in Condition 3 is preferably not greater than 50. When the $3\sigma$ is not greater than 50, the alkaline corrosion resistance of the insulator 2 is further improved.

Further, in the spark plug 1 of the present embodiment, the internal structure of the middle trunk portion 23 of the insulator 2 may be formed so as to satisfy Condition 4 described below.

<Condition 4>

In the observation region X, the average A of the proportion (porosity) of the pores is not less than 1.0% and the average B of the number of the large pores is not less than 240.

In the spark plug 1 of the present embodiment, when Condition 4 is satisfied, the alkaline corrosion resistance of the insulator 2 is further improved.

Further, in the spark plug 1 of the present embodiment, the internal structure of the middle trunk portion 23 of the insulator 2 may be formed so as to satisfy Condition 5 described below.

<Condition 5>

In the observation region X, with respect to the variation in the number of the large pores, when the standard deviation is defined as $\sigma$, the value of "the average of the number $+3\sigma$" is less than 330.

In Condition 5, the variation in the number of the large pores is defined. Specifically, when the frequency distribution of 20 numbers (number data) in total of the large pores corresponding to the respective observation regions X is regarded as a normal distribution, and the standard deviation of the number (number data) is defined as a, the value of "the average of the number $+3\sigma$" is set to be less than 330.

In the spark plug 1 of the present embodiment, when Condition 5 is satisfied, the alkaline corrosion resistance of the insulator 2 is further improved.

In the spark plug 1 of the present embodiment, the internal structure of the middle trunk portion 23 of the insulator 2 may be formed so as to satisfy Condition 6 described below.

In the mirror-polished surface 230*a*, when a region S provided between the inner peripheral surface 2*a* and the outer peripheral surface 2*b* of the insulator 2 is divided such that the length thereof in the radial direction is trisected, with respect to an inner side region Sa provided on the innermost side, 20 inner side observation regions Xa each being 192 μm×255 μm are set so as not to overlap each other, and with respect to an outer side region Sb provided on the outermost side, 20 outer side observation regions Xb each being 192 μm×255 μm are set so as not to overlap each other, an average Aa of the proportion (porosity) of the pores included in each inner side observation region Xa is smaller by 0.1 to 2% than the average of a proportion (porosity) Ab of the pores included in each outer side observation region Xb. In Condition 5, the average Aa of the proportion (porosity) of the pores included in the inner side observation region Xa is preferably smaller by 1.8 to 2% than the average of the proportion (porosity) Ab of the pores included in the outer side observation region Xb.

Figure 6:
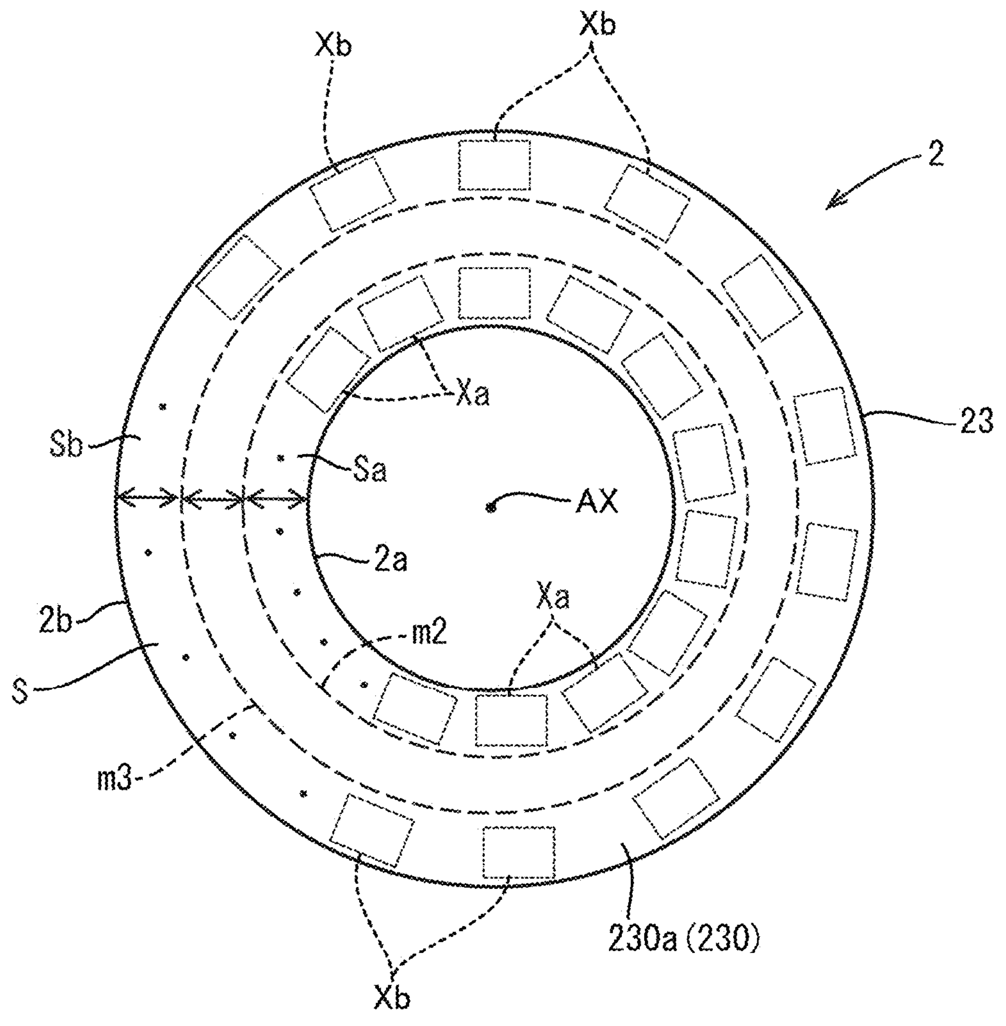
FIG. 6 schematically illustrates an inner side observation region and an outer side observation region set in a mirror-polished surface.

Here, with reference to FIG. 6, how to obtain the average Aa of the proportion (porosity) of the pores included in the inner side observation region Xa, the proportion (porosity) Ab of the pores included in the outer side observation region Xb, and the like, which are defined in Condition 6, will be described. FIG. 6 schematically illustrates the inner side observation region Xa and the outer side observation region Xb set in the mirror-polished surface 230*a*. Similar to Condition 1 and the like, in Condition 6, the state of the internal structure of the mirror-polished surface 230*a* (the cut surface 230) of the insulator 2 is the target of the definition. However, in Condition 6, the observation region (the inner side observation region Xa, the outer side observation region Xb), set in the mirror-polished surface 230*a*, for grasping the internal structure is different.

As shown in FIG. 6, two reference lines m2, m3 having circular shapes are set on the mirror-polished surface 230*a* such that the region S (the region S corresponding to the mirror-polished surface 230*a*) having an annular shape provided between the inner peripheral surface 2*a* and the outer peripheral surface 2*b* of the insulator 2 is divided such that the length thereof in the radial direction is trisected. When the two reference lines m2, m3 are set in this manner, the region S having an annular shape is divided into three regions having annular shapes provided in a concentric circular manner. Out of these regions, the region provided on the innermost side serves as the inner side region Sa, and the region provided on the outermost side serves as the outer side region Sb.

Then, with respect to the inner side region Sa, 20 inner side observation regions Xa each being 192 μm×255 μm are set so as not to overlap each other. With respect to the outer side region Sb as well, 20 outer side observation regions Xb each being 192 μm×255 μm are set so as not to overlap each other. Each inner side observation region Xa and each outer side observation region Xb are a region having a rectangular shape of which one side has a length of 192 μm and of which the other side has a length of 255 μm (i.e., 192 μm×255 μm). In Condition 6, the relationship between the state of the internal structure of the mirror-polished surface 230*a* in a place close to the inner peripheral surface 2*a* side and the state of the internal structure of the mirror-polished surface 230*a* in a place close to the outer peripheral surface 2*b* side is defined.

The inner side observation regions Xa are preferably set so as to be arranged in an annular shape while keeping an interval with each other, in the inner side region Sa having an annular shape. The outer side observation regions Xb are preferably set so as to be arranged in an annular shape while keeping an interval with each other, in the outer side region Sb having an annular shape.

The inner side observation regions Xa are preferably set so as to be close to the reference line m2 side, i.e., not close to the inner peripheral surface 2*a* side, in the inner side region Sa.

Then, an image of the mirror-polished surface 230*a* in the range corresponding to the inner side observation region Xa is captured by using an SEM, whereby an SEM image corresponding to the inner side observation region Xa is acquired. An image of the mirror-polished surface 230*a* in the range corresponding to the outer side observation region Xb is captured by using an SEM, whereby an SEM image corresponding to the outer side observation region Xb is acquired. In the case of the present embodiment, 20 SEM images respectively corresponding to the inner side observation regions Xa and 20 SEM images respectively corresponding to the outer side observation regions Xb are acquired. The acceleration voltage of the SEM is set to 20 kV, and the magnification of the SEM is set to 500 times.

With respect to the 20 SEM images corresponding to the inner side observation regions Xa, processing similar to the processing on the SEM images corresponding to the observation regions X described above is executed, whereby the average Aa of the proportion (porosity) of the pores included in each inner side observation region Xa is obtained. That is, for each inner side observation region Xa, the proportion (porosity) of the total area of all of the pores included in one inner side observation region Xa relative to the area of the inner side observation region Xa is obtained. Then, based on 20 proportions (porosities) in total obtained for the respective 20 inner side observation regions Xa, the average Aa of the proportion (porosity) of the pores included in each inner side observation region Xa is obtained.

With respect to the 20 SEM images corresponding to the outer side observation regions Xb as well, processing similar to the processing on the SEM images corresponding to the observation regions X described above is executed, whereby the average Ab of the proportion (porosity) of the pores included in each outer side observation region Xb is obtained. That is, for each outer side observation region Xb, the proportion (porosity) of the total area of all of the pores included in one outer side observation region Xb relative to the area of the outer side observation region Xb is obtained. Then, based on 20 proportions (porosities) in total obtained for the respective 20 outer side observation regions Xb, the average Ab of the proportion (porosity) of the pores included in each outer side observation region Xb is obtained.

Then, the difference (the average Ab−the average Aa) between the average Ab of the proportion (porosity) of the pores included in the outer side observation region Xb and the average Aa of the proportion (porosity) of the pores included in the inner side observation region Xa is obtained.

In the present embodiment, the internal structure of the insulator 2 (the middle trunk portion 23) may be formed such that the average Aa of the proportion (porosity) of the pores included in the inner side observation region Xa is smaller by 0.1% to 2% than the average of the proportion (porosity) Ab of the pores included in the outer side observation region Xb.

In the spark plug 1 of the present embodiment, when Condition 6 as above is satisfied, the porosity on the outer peripheral surface 2*b* side of the insulator 2 becomes higher than on the inner peripheral surface 2*a* side, in the internal structure of the insulator 2. Therefore, the mechanical strength (impact resistance) of the insulator 2 is improved.

Next, a method for manufacturing the insulator 2 will be described. The insulator 2 is one manufactured so as to satisfy Condition 1 and the like described above. The method for manufacturing the insulator 2 is not limited in particular as long as the finally obtained insulator 2 satisfies Condition 1 and the like. Here, an example of the method for manufacturing the insulator 2 is described.

The method for manufacturing the insulator 2 mainly includes a slurry production step, a deaeration step, a granulation step, a molding step, a grinding step, and a sintering step.

<Slurry Production Step>

The slurry production step is a step of producing a slurry by mixing a raw material powder, a binder, and a solvent. As for the raw material powder, as a main component, powder (hereinafter, Al compound powder) of a compound that is converted into alumina through sintering is used. As the Al compound powder, alumina powder is used, for example.

In the slurry production step, a milling step is performed for the purpose of mixing and milling the raw material powder. The milling step is performed by using a wet milling machine that uses a ball mill and the like. The diameter of cobbles used in the wet milling machine is not limited in particular as long as the object of the present invention is not impaired, and is preferably not less than 3 mm and not greater than 20 mm, more preferably not less than 3 mm and not greater than 10 mm, further preferably not less than 3 mm and not greater than 6 mm. As the cobbles, two or more types of cobbles having diameters different from each other may be combined. Through this milling step, the raw material powder comes to have a small variation in the particle size (particle diameter) and a sharp particle size distribution. When such raw material powder is used, in an alumina-based sintered body obtained after sintering, abnormal grain growth is suppressed and the sintered density can be increased. Therefore, the alkaline corrosion resistance of the insulator is improved.

The particle diameter (the particle diameter after milling) of the Al compound powder (e.g., alumina powder) is not limited in particular as long as the object of the present invention is not impaired, and is, for example, preferably not less than 1.5 μm and more preferably not less than 1.7 μm, and preferably not greater than 2.5 μm and more preferably not greater than 2.0 μm. When the particle diameter of the Al compound powder (e.g., alumina powder) is in such a range, the number of defects of the insulator is suppressed, and an appropriate sintered density is obtained. The particle diameter is the median diameter (D50) based on volume measured by a laser diffraction method (a microtrac particle size distribution measuring device manufactured by Nikkiso Co., Ltd., product name "MT-3000").

When the mass (in oxide equivalent) of the alumina-based sintered body after sintering is defined as 100 mass %, the Al compound powder is prepared so as to account for preferably not less than 90 mass % in oxide equivalent, more preferably not less than 90 mass % and not greater than 98 mass %, further preferably not less than 90 mass % and not greater than 97 mass %. As long as the object of the present invention is not impaired, the raw material powder may contain powder other than the Al compound powder.

The binder is added in the slurry for the purpose of improving moldability of the raw material powder, and the like. Examples of the binder include hydrophilic binders such as polyvinyl alcohol, aqueous acrylic resin, gum Arabic, and dextrin. These may be used singly or in combination of two or more types.

The blending amount of the binder is not limited in particular as long as the object of the present invention is not impaired, and is blended, for example, in a proportion of 1 part by mass to 20 parts by mass and preferably in a proportion of 3 parts by mass to 7 parts by mass, with respect to 100 parts by mass of the raw material powder.

The solvent is used for the purpose of, for example, dispersing the raw material powder and the like. Examples of the solvent include water and alcohol. These may be used singly or in combination of two or more types.

The blending amount of the solvent is not limited in particular as long as the object of the present invention is not impaired, and is blended, for example, in a proportion of 23 parts by mass to 40 parts by mass and preferably in a proportion of 25 parts by mass to 35 parts by mass, with respect to 100 parts by mass of the raw material powder. A component other than the raw material powder, the binder, and the solvent may be blended as necessary in the slurry. For mixing the slurry, a known stirring/mixing device or the like can be used.

<Deaeration Step>

A deaeration step may be performed as necessary on the slurry after the slurry production step. In the deaeration step, for example, a container holding the slurry after the mixing (kneading) is disposed in a vacuum deaeration device, and pressure reduction is performed so that the container is in a low atmospheric pressure environment, whereby bubbles contained in the slurry are removed. Through comparison of the density of the slurry before and after the deaeration, the amount of bubbles in the slurry can be grasped.

<Granulation Step>

The granulation step is a step of producing spherical granulated powder from the slurry containing the raw material powder and the like. The method for producing granulated powder from the slurry is not limited in particular as long as the object of the present invention is not impaired, and an example thereof is a spray-dry method. In the spray-dry method, the slurry is spray-dried by using a predetermined spray-dryer device, whereby granulated powder having a predetermined particle diameter can be obtained. The average particle diameter of the granulated powder is not limited in particular as long as the object of the present invention is not impaired, and, for example, 212 μm pass≥95% or lower is preferable, 180 μm pass≥95% or lower is more preferable, and 160 μm pass≥95% or lower is further preferable.

<Molding Step>

The molding step is a step of obtaining a molded body by molding the granulated powder into a predetermined shape with use of a mold. The molding step is performed through rubber press molding, die press molding, or the like. In the case of the present embodiment, the pressure (pressure increase rate in pressing) to be applied from the outer peripheral side to the mold (e.g., an inner rubber mold and an outer rubber mold of a rubber press molding machine) is adjusted so as to be increased stepwise. It is preferable that the adjustment is performed in a range (e.g., not less than 100 MPa) of higher pressure than conventional art. The upper limit value of the pressure is not limited in particular as long as the object of the present invention is not impaired, and may be adjusted, for example, to not greater than 200 MPa.

<Grinding Step>

The grinding step is a step of removing the machining allowance of the molded body obtained after the molding step, polishing the surface of the molded body, and the like. In the grinding step, removal of the machining allowance, polishing of the surface of the molded body, and the like are performed through grinding with a resinoid grinding wheel or the like. Through this grinding step, the shape of the molded body is adjusted.

<Sintering Step>

The sintering step is a step of obtaining an insulator by sintering the molded body of which the shape has been adjusted in the grinding step. In the sintering step, for example, sintering is performed in an air atmosphere at not less than 1450° C. and not greater than 1650° C. for 1 to 8 hours. After the sintering, the molded body is cooled, whereby the insulator 2 made from the alumina-based sintered body is obtained.

Using the insulator 2 obtained as described above, the spark plug 1 of the present embodiment is manufactured. The components other than the insulator 2 of the spark plug 1 are similar to known components as described above.

Hereinafter, the present invention will be described in further detail, based on Examples. It should be noted the present invention is not limited in any way by these Examples.

Example 1

(Production of Test Sample)

Insulators (three in total) (hereinafter, test samples) of which the basic configuration was the same as that of the insulator of the spark plug described as an example in the first embodiment above were produced by a manufacturing method similar to that in the first embodiment above. The thickness of the middle trunk portion of the insulator was 3 mm. In the slurry production step, when raw material powder was milled by a wet milling machine, cobbles (ϕ3 mm) having a diameter of 3 mm and cobbles (ϕ10 mm) having a diameter of 10 mm were used in proportions of 50 mass % and 50 mass %, respectively.

(Measurement of Withstand Voltage after Alkaline Corrosion)

In order to measure the withstand voltage after alkaline corrosion, an insulator having been processed in advance was prepared. Specifically, insulation processing was performed in advance to the periphery of the leg portion such that, when a center electrode body was mounted to the inside of the insulator, the front end of the center electrode body was not exposed from the leg portion and the thickness of the leg portion was substantially constant. Then, the insulator having mounted thereto the bar-like center electrode body, with the front end thereof rounded so as not to cause electric field concentration and with the opening at the front end of the insulator closed, was assembled to a metal shell to produce a test sample. The test sample was set in a heating furnace kept at about 200° C., and a voltage of 35 kV was applied for 100 hours from a front end portion of the center electrode body of the test sample. Earthing (grounding) at that time was provided through the metal shell. By continuously applying the voltage to the insulator of the test sample in this manner, without causing discharge to the outside, electric field concentration was caused at a predetermined place (the portion opposed to the electrode flange portion (the diameter-enlarged portion) in the radial direction) of the middle trunk portion of the insulator, whereby alkaline corrosion of the predetermined place was forcibly caused. The presence or absence of alkaline corrosion can be determined by measuring the presence or absence of an alkali metal such as Na or an alkaline-earth metal with respect to the insulator, by using an electron beam probe microanalyzer (EPMA).

Then, the test sample including the insulator having undergone alkaline-corrosion was set in a high-pressure chamber, and in a state where carbon dioxide gas ($CO_2$) was supplied at a pressure of about 5 MPa in the high-pressure chamber, voltage was applied at an increase rate of 0.1 kV/sec from the front end portion of the center electrode body of the test sample. Earthing (grounding) at that time was provided through the metal shell. The breakdown voltage at penetration of the insulator was measured. The results are shown in Table 1.

(Observation 1 of Cut Surface (Mirror-Polished Surface) of Middle Trunk Portion)

With respect to the obtained test sample, the insulator was cut in a direction perpendicular to the axial line direction, at a position separated by 2 mm from the portion having the maximum diameter of the diameter-enlarged portion of the center electrode to the rear end side along the axial line direction. Then, the cut surface of the obtained test sample was polished into a mirror state, and the structure of the cut surface (mirror-polished surface) was observed by an SEM (model "JSM-IT300LA" manufactured by JEOL Ltd.). The acceleration voltage of the SEM was set to 20 kV, and the magnification of the SEM was set to 500 times. Then, in the cut surface (mirror-polished surface), 20 observation regions X each being 192 μm×255 μm were set so as to each overlap the reference position m1 being the center position between the inner peripheral surface 2*a* and the outer peripheral surface 2*b* of the insulator 2 and so as not to overlap each other. Then, 20 SEM images in total corresponding to the 20 observation regions X were acquired. Then, with respect to the SEM images, image analysis processing was executed by image analysis software (WinROOF (registered trademark) manufactured by MITANI CORPORATION), whereby the average A of the proportion (porosity) of pores included in each observation region X was obtained. The frequency distribution of the 20 porosities in total corresponding to the respective observation regions X was regarded as a normal distribution, and the standard deviation a of the porosity was obtained. The results are shown in Table 1.

With respect to the 20 observation regions X, for each observation region X, the number of large pores each having an area of not less than 0.05 $\mu m^2$ was counted. Then, based on 20 values (number data) in total of the number of the large pores, the average (average number) B of the number of the large pores was obtained. The results are shown in Table 1.

With respect to a case where the frequency distribution of the 20 values (number data) in total of the number of the large pores corresponding to the respective observation regions X was regarded as a normal distribution, the value of "3σ" when the standard deviation of the value (number data) of the number was defined as a, and the value (number) of "the average B+3σ" was obtained. The results are shown in Table 1.

Examples 2 to 10 and Examples 12 to 17

Insulators of Examples 2 to 10 and Examples 12 to 17 were produced in a similar manner to that in Example 1, except that, in the slurry production step, the ratio of cobbles to be used in milling the raw material powder was changed as appropriate.

Comparative Example 11

An insulator of Comparative Example 1 was produced in a similar manner to that in Example 1, except that, in the slurry production step, when the raw material powder was milled by a wet milling machine, cobbles ($\phi$3 mm) having a diameter of 3 mm, cobbles ($\phi$10 mm) having a diameter of 10 mm, and cobbles (430 mm) having a diameter of 30 mm were used in proportions of 10 mass %, 40 mass %, and 50 mass %, respectively.

Comparative Example 21

An insulator of Comparative Example 2 was produced in a similar manner to that in Comparative Example 1, except that, in the slurry production step, the ratio of cobbles to be used in milling the raw material powder was changed as appropriate.

With respect to the insulators of the Examples 2 to 10, Examples 12 to 17, and Comparative Examples 1, 2 having been obtained, "measurement of withstand voltage after alkaline corrosion" and "observation 1 of cut surface (mirror-polished surface) of middle trunk portion" described above were performed, as in Example 1.

Further, with respect to Example 4, Example 9, Example 10, Examples 12 to 14, and Examples 16, 17, "observation 2 of cut surface (mirror-polished surface) of middle trunk portion" and "evaluation of impact resistance" described below were performed. The results are shown in Table 1.

(Observation 2 of Cut Surface (Mirror-Polished Surface) of Middle Trunk Portion)

The mirror-polished surface of the insulator used in "Observation 1 of cut surface (mirror-polished surface) of middle trunk portion" above was observed by an SEM. The acceleration voltage of the SEM was set to 20 kV, and the magnification of the SEM was set to 500 times. Then, as shown in FIG. 6, in the mirror-polished surface, the region S provided between the inner peripheral surface 2*s* and the outer peripheral surface 2*b* of the insulator was divided such that the length thereof in the radial direction was trisected, and then, 20 inner side observation regions Xa each being 192 μm×255 μm were set so as not to overlap each other in the inner side region Sa provided on the innermost side, and 20 outer side observation regions Xb each being 192 μm×255 μm were set so as not to overlap each other in the outer side region Sb provided on the outermost side.

Then, 20 SEM images corresponding to the inner side observation regions Xa and 20 SEM images corresponding to the outer side observation regions Xb were acquired, and based on the SEM images, the average Aa of the proportion (porosity) of the pores included in each inner side observation region Xa, and the average Ab of the proportion (porosity) of the pores included in each outer side observation region Xb were obtained. Then, the difference between the average Aa and the average Aa (the average Ab−the average Aa) was obtained. The results are shown in Table 1.

(Evaluation of Impact Resistance)

The Charpy test defined in JIS B7733 was performed on each insulator, and the impact resistance of the insulator was evaluated. The specific evaluation method was as follows. First, using the insulator, a spark plug (hereinafter, test spark plug) having a configuration similar to that described as an example in the first embodiment above was produced. The axial line direction of the test spark plug was defined as the up-down direction, the front end side was directed downwardly, and the screw portion of the metal shell of the test spark plug was screwed into a screw hole provided in a test stand, to fix the test spark plug. A hammer having a shaft fulcrum above in the axial line direction of the fixed test spark plug was provided so as to be rotatable. Then, the front end of the hammer was raised and then released, to rotate the hammer by free fall, whereby the front end of hammer was caused to collide with a portion at substantially 1 mm from the rear end of the insulator. With the raising angle (the angle with respect to the axial line direction) of this hammer set to 34 degrees, the front end of the hammer was caused to collide with the insulator of the test spark plug, and whether or not a crack was caused in the insulator was confirmed. Such a collision of the hammer was performed twice at maximum with respect to each insulator. When a crack was caused in the insulator due to the first collision, the test was ended then. In contrast to this, when no crack was caused in the insulator due to the first collision, the second collision was further performed with respect to the insulator. The results are shown in Table 1. In Table 1, a case where a crack was caused in the insulator due to the first collision was represented by the symbol "x", and a case where a crack was caused in the insulator due to the second collision was represented by "o", and a case where no crack was caused even due to the second collision was represented by the symbol "0".

TABLE 1

| | NUMBER OF LARGE PORES | | | POROSITY | | | | WITHSTAND VOLTAGE | |
|---|---|---|---|---|---|---|---|---|---|
| | AVERAGE B (NUMBER) | 3 σ | Average B + 3σ (NUMBER) | AVERAGE A (%) | σ | AVERAGE Ab − AVERAGE Aa (%) | THICKNESS (mm) | (kV) AFTER ALKALINE CORROSION | IMPACT RESISTANCE |
| EXAMPLE 1 | 285 | 42 | 327 | 2.9 | 0.32 | | 3 | 38 | |
| COMPARATIVE EXAMPLE 1 | 276 | 55 | 331 | 3.8 | 0.37 | | 3 | 30 | |
| EXAMPLE 2 | 600 | 923 | 1523 | 2.5 | 0.21 | | 3 | 35 | |
| EXAMPLE 3 | 180 | 45 | 225 | 2.5 | 0.36 | | 3 | 32 | |
| EXAMPLE 4 | 203 | 141 | 344 | 1.9 | 0.21 | 0 | 3 | 34 | X |
| EXAMPLE 5 | 880 | 853 | 1733 | 3.5 | 0.23 | | 3 | 32 | |
| COMPARATIVE EXAMPLE 2 | 293 | 62 | 355 | 3.5 | 0.37 | | 3 | 30 | |
| EXAMPLE 6 | 240 | 103 | 343 | 1.9 | 0.20 | | 3 | 35 | |
| EXAMPLE 7 | 274 | 50 | 324 | 2.8 | 0.22 | | 3 | 38 | |

TABLE 1-continued

| | NUMBER OF LARGE PORES | | | POROSITY | | | | WITHSTAND VOLTAGE | |
|---|---|---|---|---|---|---|---|---|---|
| | AVERAGE B (NUMBER) | 3 σ | Average B + 3σ (NUMBER) | AVERAGE A (%) | σ | AVERAGE Ab − AVERAGE Aa (%) | THICKNESS (mm) | (kV) AFTER ALKALINE CORROSION | IMPACT RESISTANCE |
| EXAMPLE 8 | 261 | 66 | 327 | 2.9 | 0.23 | | 3 | 37 | |
| EXAMPLE 9 | 216 | 41 | 257 | 1.9 | 0.33 | 0.1 | 3 | 38 | ○ |
| EXAMPLE10 | 233 | 40 | 273 | 2.0 | 0.33 | 2.0 | 3 | 38 | ◎ |
| EXAMPLE12 | 215 | 42 | 257 | 2.0 | 0.33 | 2.5 | 3 | 36 | ○ |
| EXAMPLE13 | 230 | 40 | 270 | 1.9 | 0.33 | 1.2 | 3 | 38 | ○ |
| EXAMPLE14 | 239 | 100 | 339 | 1.9 | 0.33 | 0.05 | 3 | 34.5 | ○ |
| EXAMPLE15 | 200 | 101 | 301 | 1.5 | 0.3 | | 3 | 36 | |
| EXAMPLE16 | 374 | 79 | 453 | 2.39 | 0.25 | 1.8 | 3 | 35 | ◎ |
| EXAMPLE17 | 281 | 48 | 329 | 2.04 | 0.25 | 1.8 | 3 | 38 | ◎ |

As shown in Table 1, Examples 1 to 10 and Examples 12 to 17 satisfying Condition 1 described above are excellent in withstand voltage performance after alkaline corrosion when compared with those of Comparative Examples 1, 2. It was confirmed that, in Examples 1 to 10 and Examples 12 to 17, even when processed under a condition of forcibly causing alkaline corrosion, alkaline corrosion was able to be suppressed.

Example 1, Example 2, Example 4, Examples 6 to 10, and Examples 12 to 17 which further satisfied Condition 2 described above, out of Examples 1 to 10 and Examples 12 to 17, were more excellent in the result of alkaline corrosion resistance when compared with those of Examples 3, 5.

Example 9, Example 10, Examples 12 to 14, and Examples 16 to 17 which satisfied Condition 3 described above were confirmed to be excellent in impact resistance (Charpy strength) when compared with that of Example 4.

Example 1, Example 7, Examples 9 to 13 and Example 17, further in which 3σ of Condition 3 described above was not greater than 50 (i.e., $3\sigma \leq 50$), out of Example 1, Example 2, Example 4, Example 6, Example 7, Example 9, Example 10, Examples 12 to 15, and Example 17, were confirmed to be more excellent in alkaline corrosion resistance when compared with those of Example 2, Example 4, Example 6, and Example 14 to 16.

Example 1, Example 7, Example 8, Example 16, and Example 17 which satisfy Condition 4 described above are excellent in alkaline corrosion resistance. Among these, Example 1, Example 7, and Example 17 which correspond to the case of $3\sigma \leq 50$ are excellent in alkaline corrosion resistance in particular, when compared with those of Example 8 and Example 16 which correspond to the case of $50 < 3\sigma \leq 100$.

Example 1, Examples 7 to 10, Example 12, Example 13, Example 15, and Example 17 which further satisfied Condition 5 described above, out of Example 1, Example 2, Example 4, Examples 6 to 10, and Examples 12 to 17, were confirmed to be more excellent in alkaline corrosion resistance when compared with those of Example 2, Example 4, Example 6, Example 14, and Example 16.

Example 10, Example 16, and Example 17 which further satisfied Condition 6 described above, out of Example 9, Example 10, Examples 12 to 14, and Examples 16 to 17, were confirmed to be more excellent in impact resistance (Charpy strength) when compared with those of Example 9 and Examples 12 to 14.

EXPLANATION OF SYMBOLS

1: spark plug
2: insulator
21: through-hole
22: leg portion
23: middle trunk portion
230: cut surface
230*a*: mirror-polished surface
24: flange portion
25: rear-side tube portion
26: first diameter-enlarged portion
27: second diameter-enlarged portion
3: center electrode
31: center electrode body
31*a*: diameter-enlarged portion (electrode flange portion)
31*b*: electrode head portion
31*c*: electrode leg portion
4: ground electrode
5: metal terminal
6: metal shell
7: resistor
8: seal member
9: seal member
11: pore
AX: axial line
Sa: inner side region
Sb: outer side region
X: observation region
Xa: inner side observation region
Xb: outer side observation region A What is claimed is:

1. A spark plug comprising:

an insulator having a tubular shape extending along an axial line direction thereof and made from an alumina-based sintered body;

a center electrode being a bar-like electrode inserted in the insulator such that a front end of the bar-like electrode is exposed from the insulator and a ear end of the bar-like electrode is housed inside the insulator, the center electrode having, on a rear end side thereof, a diameter-enlarged portion enlarged in a radial direction and engaged with an inner wall of the insulator; and a conductive sealing material provided on the rear end side of the center electrode inside the insulator, wherein in a mirror-polished surface obtained by mirror-polishing a cut surface obtained by cutting the insulator in a direction perpendicular to the axial line direction, at a position 2 mm from a portion having a maximum diameter of the diameter-enlarged portion to the rear end side along the axial line direction, when 20 observation regions each being 192 μm×255 μm are set so as to each overlap a reference position being a center position between an inner peripheral surface and an outer peripheral surface of the insulator and so as not to overlap each other, an average of a porosity of pores included in each observation region is not greater than 3.5% and, with respect to a variation in the porosity, when a standard deviation is defined as σ, σ is not greater than 0.36.

2. The spark plug according to claim 1, wherein, in the observation region, an average of the number of large pores, out of the pores, each having an area of not less than 0.05 $\mu m^2$ is not less than 200 and not grater than 600.

3. The spark plug according to claim 2, wherein, with respect to a variation in the number of the large pores in the observation region, when a standard deviation is defined as σ, 3 σ is not greater than 100.

4. The spark plug according to claim 3, wherein the 3σ is not greater than 50.

5. The spark plug according to claim 2, wherein, in the observation region, the average of the porosity of the pores is not less than 1.0% and the average of the number of the large pores is not less than 240.

6. The spark plug according to claim 2, wherein, in the observation region, with respect to a variation in the number of the large pores, when a standard deviation is defined as a, a value of "the average of the number +3σ" is less than 330.

7. The spark plug according to claim 2, wherein in the mirror-polished surface, when a region provided between the inner peripheral surface and the outer peripheral surface of the insulator is divided such that a length thereof in the radial direction is trisected, with respect to an inner side region provided on an innermost side, 20 inner side observation regions each being 192 μm×255 μm are set so as not to overlap each other, and with respect to an outer side region provided on an outermost side, 20 outer side observation regions each being 192 μm×255 μm are set so as not to overlap each other, an average of a porosity of pores included in each inner side observation region is smaller by 0.1 to 2% than an average of a porosity of pores included in each outer side observation region.

* * * * *